United States Patent [19]
Walton

[11] Patent Number: 5,722,223
[45] Date of Patent: Mar. 3, 1998

[54] TREE TRIMMING APPARATUS

[76] Inventor: William H. Walton, Rt. 2, Box 150, Weiss Ln., Pflugerville, Tex. 78660

[21] Appl. No.: 705,288

[22] Filed: Aug. 29, 1996

[51] Int. Cl.$^6$ .................................................. A01D 75/30
[52] U.S. Cl. ...................... 56/13.7; 56/16.4 R; 56/234; 56/237
[58] Field of Search ....................... 56/13.7, 13.6, 56/16.4 R, 14.7, 16.9, 265, 296, 299, 233, 234, 235, 236, 237, DIG. 3, DIG. 9, DIG. 10; 144/343, 355

[56] References Cited

U.S. PATENT DOCUMENTS

| | | | |
|---|---|---|---|
| 3,715,872 | 2/1973 | Thompson, Jr. | 56/10.4 |
| 4,355,497 | 10/1982 | Murphy | 56/235 |
| 4,383,401 | 5/1983 | Lessard et al. | 56/236 |
| 4,455,815 | 6/1984 | Grant | 56/235 |
| 5,107,592 | 4/1992 | Downey et al. | 56/233 X |

*Primary Examiner*—Terry Lee Melius
*Attorney, Agent, or Firm*—Donald L. Walton

[57] ABSTRACT

Trimming apparatus adapted to trim evergreen and like trees into a conical shape as well as mowing weeds and grass on the ground around the trees. The trimming apparatus includes a mobile self-propelled riding power platform with an upwardly and outwardly extending cutter means to trim a tree as the powered platform is driven around the tree. The platform further provides a mower cutting means mounted under the platform for cutting grass and weeds around the base of a tree.

10 Claims, 3 Drawing Sheets

TREE TRIMMING APPARATUS

BACKGROUND OF THE INVENTION

This invention relates to devices for trimming trees and ground cover and more particularly to a self-propelled riding tree trimmer.

It is necessary to periodically trim or prune trees to obtain the desired shape for the tree. This is especially true with trees to be sold as Christmas trees. There is a need to not only trim a Christmas tree into a conical shape but to trim the bottom of the tree. To make a Christmas tree farm more acceptable to cut-your-own customers there is further need to keep the grass and weeds cut from around the tree.

Various tree trimming apparatus have been used to trim trees. Tree trimming apparatus which are totally supported by an operator are known. Such trimmers are either hand held or carried on an operator's back with the cutting blade being hand held and operated. Both type of operator carried trimmers have hand guided cutting means to trim the tree. One of the primary problems with hand-held tree trimming apparatus is that it is difficult to maintain uniformity in the trimmed tree and to trim the tree at a desired angle. Such operator carried trimmers are also very labor intensive which limits the number of trees that may be trimmed per day.

A variety of tree trimming apparatus mounted on machines have been proposed, such as those disclosed in U.S. Pat. Nos. 2,940,486; 3,496,709; 3888,071; 3,913,304; and 4,383,401. Machine mounted tree trimming apparatus as disclosed in these patents have a major problem of being so large that it is difficult to use them in Christmas tree! fields where the trees are planted on a standard spacing. Other problems of these trimmers are the expense of manufacture and the time necessary to position the machines to trim a tree.

Another solution for trimming Christmas trees is disclosed in U.S. Pat. Nos. 4,455,815 and 4,577,457 where a self-propelled tree trimmer has handles which an operator manually grasp, the operator walks behind the machine to support and guide the trimmer around a tree. The use of these manually guided trimmers is limited by the stamina and dexterity of an operator U.S. Pat. No. 4,577,457 further discloses attaching a riding attachment to the self-propelled trimmer so that an operator can ride. The riding attachment not only increases the difficulty of maintaining balance as the trimmer is being used but also applies an unacceptable drag. The drive wheel of the trimmer is unable to pull the weight of the machine and rider, especially when used in soft or sandy soil conditions.

Applicant's copending U.S. application Ser. No. 08/420, 092 discloses a tree trimming apparatus which is sufficiently compact to trim trees planted on a standard spacing, has a simple construction making it economically feasible in operation to trim Christmas trees. The problems and disadvantages associated with the prior art devices are essentially overcome by applicant's prior tree trimming apparatus which has a removable cutter means either fixed at a desirable angle or has an automatic angle adjusting means which adjust the angle of the cutter means with respect to the slope of the ground. Applicant's prior tree trimming apparatus has the cutter means mounted on a back wheel axle of a self-propelled power platform. The power platform has two casting front wheels and a transmission system capable of driving right and left back drive wheels at different speeds.

Applicant's prior trimming device is very efficient in trimming Christmas trees; however, there is a couple of problems. As the trees grow larger the spacing between the trees becomes less whereby the four wheel power platform is two wide across the casting front wheels to satisfactorily fit between the trees. Another problem is the location of the cutter means on the back wheel axle. An operator of the tree trimming apparatus must closely watch the cutter means during the trimming operation to guide the trimmer around a tree at the desired position. This makes it difficult to watch both where the power platform is going and the cutting means which is trimming the tree.

SUMMARY OF THE INVENTION

These and other problems and disadvantages associated with the prior devices are overcome by the invention disclosed herein by providing a trimming apparatus which is sufficiently compact to allow access to the trees planted on standard spacing, such as Christmas trees, even as they grow larger. Further, the trimming apparatus is simple in construction, thereby making it economically feasible in operation to trim Christmas trees.

The trimming apparatus of the present invention includes a mower with a tree trimming cutter means mounted on the side of a riding power platform and located in front of the operator. The power platform is essentially a self-propelled riding mower, such as disclosed in U.S. Pat. No. 2,899,793, issued to M. B. Swisher, which is hereby incorporated within by reference. The tree trimming cutter means is mounted on a supporting mower deck connected to a power platform support frame in front of one of the back wheels. The cutter means is preferably a sickle bar type with two sets of cutter blades. Both sets of cutter blades move in opposite directions when in operation and may be powered by an individual power transmission device such as a motor or by power drives associated with the riding platform motor. A flexible power transmission cable is used to transmit power from the power transmission device to a reciprocating drive means such as disclosed in U.S. Pat. No. 4,866,921, issued to Akira Nagashima. In operation the tree trimmer and mower may be operated separately or simultaneously. The area around and between the base of adjacent trees may be mowed while the tree is being trimmed.

The self-propelled power platform of the present invention is a riding lawn mower of three wheel type as known in the prior art as disclosed by U.S. Pat. No. 2,899,793. The power platform has a single driven steering wheel mounted on the forward portion of the power platform support frame. The front wheel is sufficiently large to drive and steer the power platform. At least two back wheels are located at the rear of the self propelled riding power platform and are adjustably connected to the supporting mower deck behind the front power wheel. The back wheels are free wheeling and have a wide profile or they may be dual wheels to help stabilize the power platform when used over rough ground. The mower blade with the mower deck is positioned below the power platform support frame and located between the front and rear wheels.

The self-propelled power platform has an additional stabilizing caster wheel attached to the supporting mower deck and located ahead of the cutter means. The caster wheel is not a load bearing wheel and is positioned at ground level or slightly above ground level. Without a stabilizing wheel the weight of the cutter means, will tip the power platform sideways as it moves over uneven ground creating uneven trimming of a tree. The caster wheel will contact the ground and support the weight of the cutter mean on any slight tipping of the power platform, thereby stabilizing the power platform.

One embodiment of the present trimmer is best suited for use on substantially level ground with the cutter means set at a fixed angle to the riding self-propelled power platform. When used over ground having a slope, the fixed angle cutter means will trim a tree with the conical cutting shape perpendicular to the slope of the ground rather than straight up and down as desired. The fixed angle cutter means will function to cut the desired uniform conical shape for Christmas trees as long as the power platform remains on a plane perpendicular to the upward growth of the tree. Gradual sloping ground surfaces may be tolerated.

Another embodiment of the trimming apparatus is provided with an automatic angle adjusting means to adjust the angle of the cutter means with respect to the slope of the ground. This embodiment not only functions to trim trees planted on level ground but also will trim trees which are planted on hills where the slope of the ground is not perpendicular to the growth of the trees.

Accordingly, a primary object of this invention is to provide a novel self-propelled tree trimming apparatus on which an operator may ride.

A further object of the invention is to provide a riding self-propelled apparatus which will simultaneously trim a tree as well as mow weeds and grass from around the base of the tree.

A further object of the invention is to provide a gravity operated automatic angle adjuster which will maintain the angle of the cutter means at a desired cutting angle.

Other features and advantages of the present invention will be apparent from the following description of the preferred embodiments of the invention taken with reference to the accompanying drawings.

DESCRIPTION OF THE PREFERRED EMBODIMENT

Figure 1:
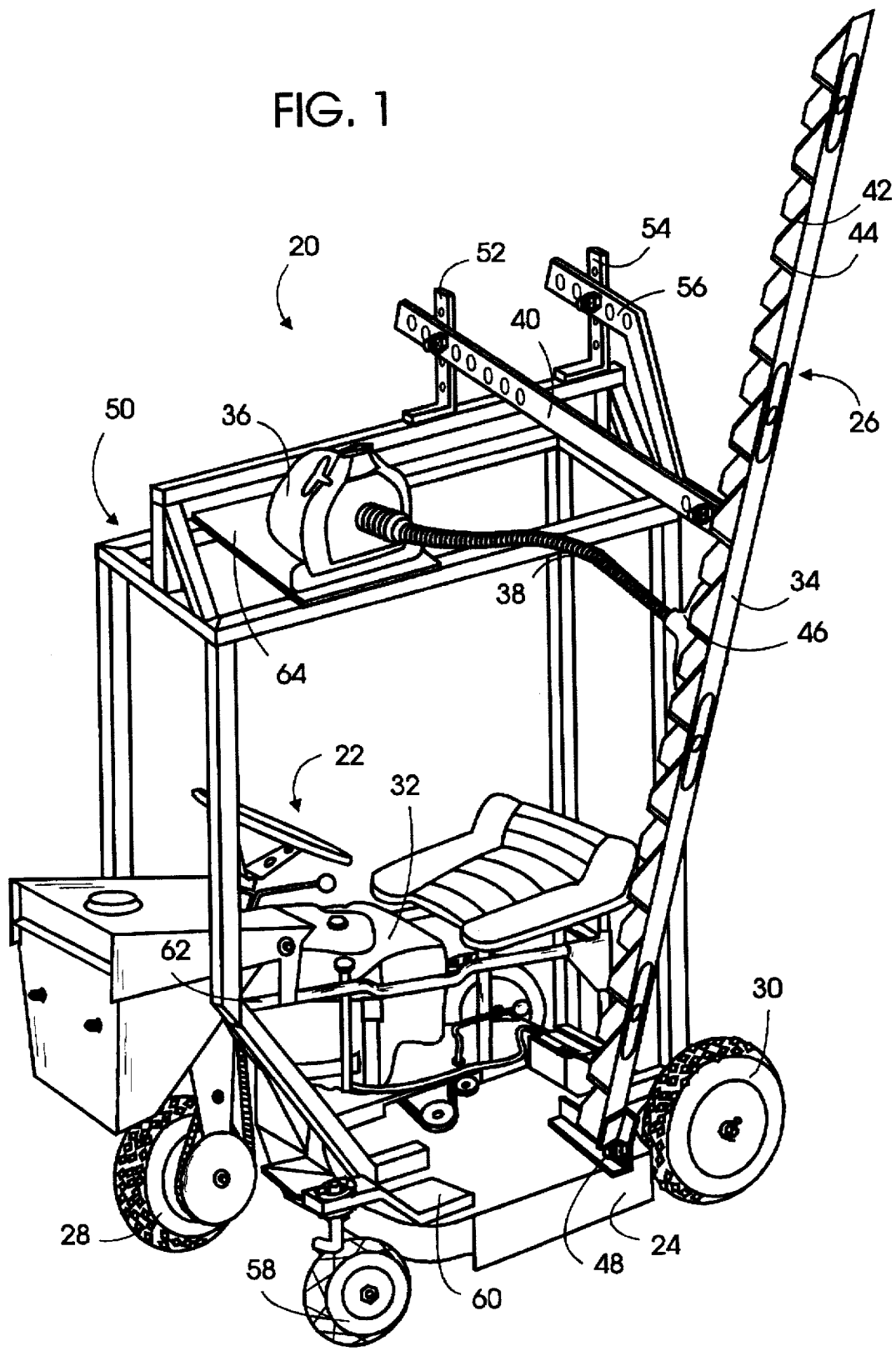
FIG. 1 is a perspective view of a simplified diagrammatic illustration of the trimming apparatus of the present invention.
Figure 3:
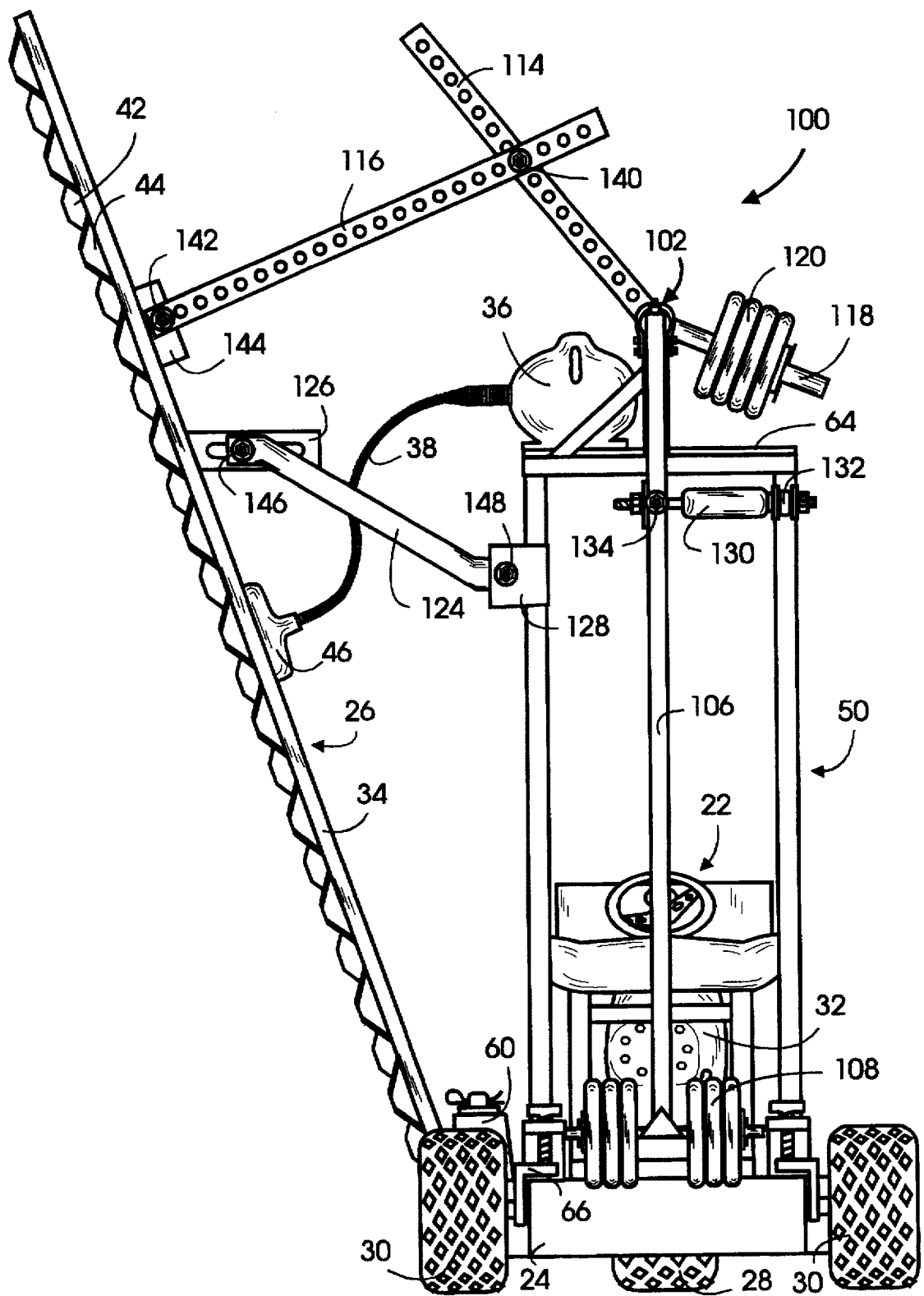
FIG. 3 is a simplified diagrammatic rear view of the preferred embodiment illustrated in FIG. 2.

FIG. 1 shows trimming apparatus 20 of the present invention. Trimming apparatus 20 includes a self-propelled riding power platform 22 with a rotary mower (not shown) located under a mower deck 24 which is structural supporting deck, and a tree trimming cutter assembly The rotary mower power platform 22 is essentially conventional in construction and will not be described in great detail. Basically the power platform is a three wheel riding lawn mower type such as disclosed in U.S. Pat. No. 2,899, 793, issued to Max B. Swisher. The single front driven steering wheel 28 attached to the front of power platform support frame 62, provides driving power for the power platform and also is used to steer the same. Rear wheels 30 movably attached to the back of the supporting mower deck 24 are free wheeling and provide support. As shown in FIG. 3 the rear wheels are connected to the supporting mower deck through mower cutting height adjusters 66. Additional lateral support may be provided to the power platform 22 through the use of dual back wheels. Motor 32 provides power to the front wheel as well as power to the rotary mower. The front driven steering wheel 28 may be turned through 360° degrees which permits the power platform to make sharp turns as well as to travel in reverse.

The tree trimming cutter assembly 26 includes cutter means 34, power transmission device 36, transmission power cable 38 and angle adjusting support means 50. Cutter means 34, as illustrated, is a sickle bar type with two sets of cutter blades 42 and 44. Both sets of cutter blades move in opposite directions when in operation and are powered through a flexible transmission power cable 38 extending from power transmission device 36 to a conventional reciprocating drive means 46, such as disclosed in U.S. Pat. No. 4,866,921, issued to Akira Nagashima. Power transmission device 36, as illustrated in FIG. 1, is an auxiliary motor mounted on power transmission support plate 64 which is used to rotate transmission power cable 38. Other types of systems to deliver power to the sickle bar cutter means 34 would be well within the skill and obvious to the artisan. For example, a hydrolytic pump powered by motor 32 of the power platform 22 could be used to turn a hydrolytic motor connected to the reciprocating drive means 46.

Sickle bar cutter means 34 is connected through hinge 48 to supporting mower deck 24. Hinge 48 permits cutter means 34 to move so the angle of cutting may be adjusted. Angle adjusting support bar 40 is connected between angle supporting bracket 52 attached to the angle adjusting support means 50 and cutter means 34 to hold cutter means 34 in a predetermined desirable angle with respect to power platform 22. Adjusting the length of support bar 40 between supporting bracket 52 and cutter means 34 will change the cutting angle of the trimming apparatus. Angle adjusting support means 50 is connected to supporting mower deck 24 of self-propelled riding power platform 22. Stabilizing support bar 56 is connected to stabilizing supporting bracket 54 and to angle adjusting support bar 40 near the cutting sickle bar. Stabilizing support bar 56 holds the cutting sickle bar in an upright position and stops front to back movement during operation.

Figure 2:
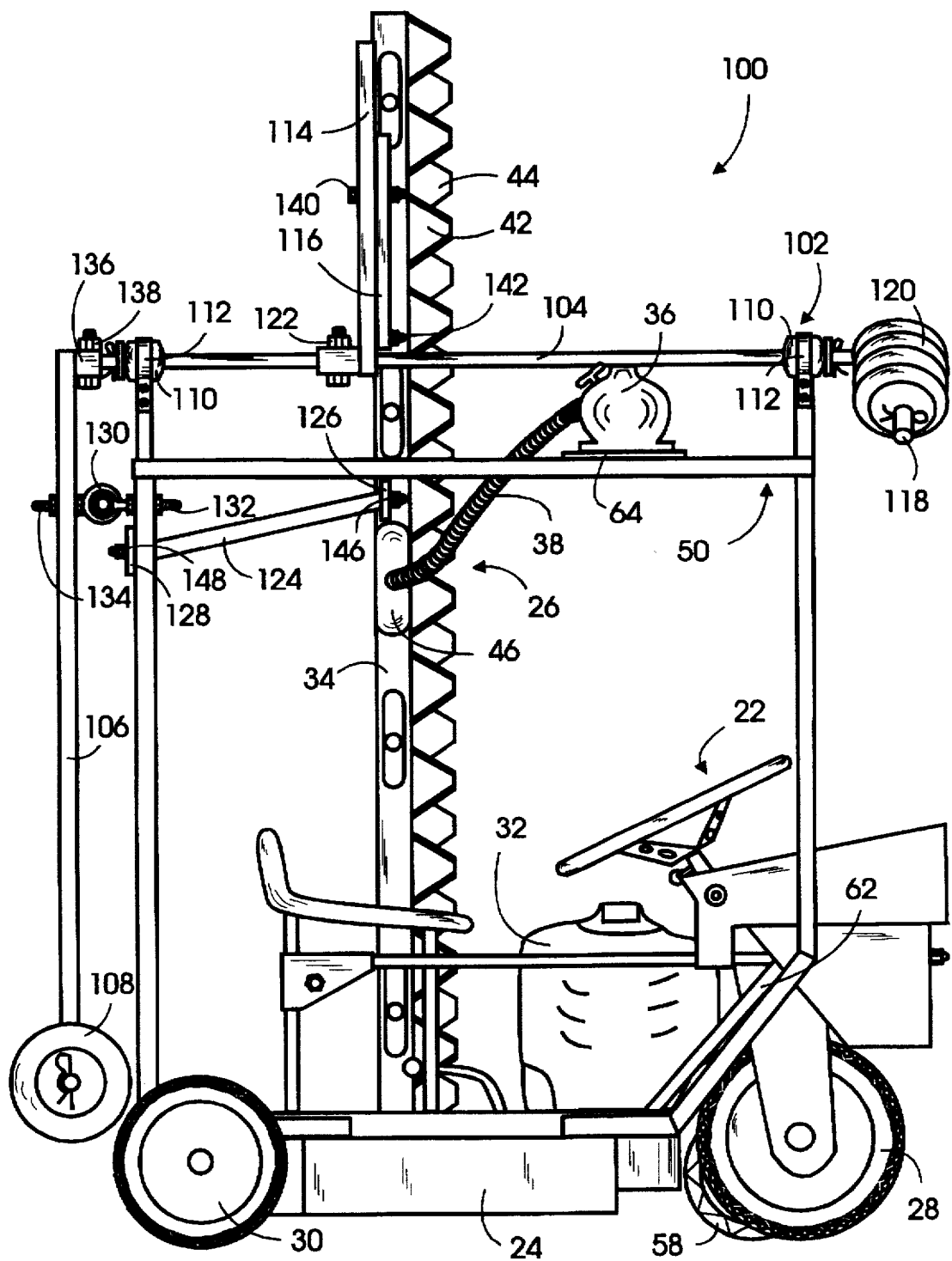
FIG. 2 is a simplified diagrammatic side view of a preferred embodiment of the trimming apparatus of the present invention.

The trimming apparatus is provided with a stabilizing caster wheel 58 attached to the supporting mower deck 24 through a caster wheel support bracket 60. The stabilizing caster wheel 58 stops the trimming apparatus from tilting during operation due to the weight of the sickle bar cutter means Trimming apparatus 100 illustrated in FIGS. 2 and 3 is a preferred embodiment. The self-propelled riding power platform 22 and angle adjusting support frame 50 are essentially the same as previously described. Mounted on angle adjusting support means 50 is an automatic angle adjuster assembly 102. Automatic angle adjuster assembly 102 automatically controls the angle of sickle bar cutter means 34 with respect to the power platform 22. As the power platform 22, upon which the automatic angle adjuster assembly 102 is mounted, tilts due to the slope of the ground an automatic adjustment will be made to hold the cutting sickle in a desired upright cutting position.

The automatic angle adjuster assembly 102 is mounted on angle adjusting support means 50 with control shaft bearings through bearing support brackets 112. Rotatable control shaft 104 passing through bearings 110 is connected to pendulum arm 106 with pendulum connecting sleeve 136 and pendulum lock bolt Pendulum weights 108 are positioned at the end of pendulum arm 106. Control arm 114 is connected to control shaft 104 with a control arm lock bolt 122. Control arm extension 116 is movably connected at one end to control arm 114 with a pivot bolt 140 and to cutter means 34 through extension support bracket 144 with pivot bolt 142. A counter weight shaft 118 is connected to control shaft 104 with sufficient counter weights 120 positioned on shaft 118 to balance the weight of cutter means 34. With the weight of the sickle cutter bar balanced by counter weights 120 the pendulum weights 108 will freely swing to maintain pendulum arm 106 in an upright position due to gravity. When the power platform tilts due to the slope of the ground the gravity operated angle adjuster will correct the cutting angle of cutter means 34. To dampen the swinging action of the pendulum when the trimming apparatus is being operated a pendulum stabilizer 130 is attached to angle adjusting support means 50 through stabilizer eye-bolt 132 and to pendulum arm 106 through stabilizer eye-bolt 134. Stabilizer 130 may be a shock absorber which tends to resist sudden movements pendulum arm 106.

Control arm extension 116 determines the angle of the sickle cutter bar. A desired cutting angle may be set by adjusting the length of control arm extension between control arm 114 and extension support bracket 144. To adjust the amount of movement of cutter means 34 with respect to movement of the pendulum, pivot bolt 140 connecting control arm extension 116 to control arm 114 may be moved along control arm 114. As the distance between pivot bolt 140 and control shaft 104 increases, the automatic adjustment movement for cutter means 34 will be greater.

Lateral support arm 124 is attached to angle adjusting support means 50 through lateral arm support bracket 128 with pivot bolt 148. The other end of lateral support arm 124 is attached to cutter means 34 through slide bracket 126 with slide bolt 146. The lateral support arm 124 stops the sickle bar from movement toward the front and rear of riding power platform 22 but permits changes in the angle of the sickle cutter bar with respect to the power platform corresponding to movement of the pendulum.

While several embodiments of the present invention have been illustrated and described herein in particular detail, it will be understood that variations and modifications may be effected without departing from the spirit and scope of the novel concepts of this invention.

What is claimed is:

1. A trimming apparatus comprising a self-propelled riding power platform and a tree trimming cutter assembly, said self-propelled riding power platform includes a motor for providing power, at least two rear wheels, a single front driven steering wheel, a stabilizing caster wheel, a supporting deck, and a power platform support frame, said front driven steering wheel is connected to the front of said power platform support frame, said supporting deck is attached to and located below said power platform support frame, said rear wheels are adjustably connected to the rear of said supporting deck, said stabilizing caster wheel is positioned forward of one of said rear wheels and attached to said supporting deck, said tree trimming cutter assembly comprises a cutter means and a means for holding said cutter means at a desired preset cutting angle in relation to said power platform said cutter means is movably connected at one end to said supporting deck and positioned to the side of said self-propelled riding power platform between one of said rear wheels and said stabilizing caster wheel.

2. The trimming apparatus according to claim 1, said means for holding said cutter means comprises an angle adjusting support means connected to said supporting deck, an angle adjusting support bar is adjustably connected to said angle adjusting support means and to said cutter means, whereby the angle of said cutter means may be adjusted by changing the length of said angle adjusting support bar between said cutter means and said angle adjusting support means, a stabilizing support bar is connected between said angle adjusting support bar and said angle adjusting support means to support said cutter means in an upright position.

3. The trimming apparatus according to claim 1, wherein said cutter means is a sickle bar type, said tree trimming cutter assembly includes a power transmission device and a transmission power cable to provide power to said cutter means.

4. The trimming apparatus according to claim 2, wherein said cutter means is a sickle bar type, said tree trimming cutter assembly includes a power transmission device and a transmission power cable to provide power to said cutter means.

5. The trimming apparatus according to claim 1, wherein said means for holding said cutter means comprises, an angle adjusting support means, and an automatic angle adjuster assembly, said automatic angle adjuster assembly comprises a pendulum arm connected to a control shaft, said control shaft is movably held with control shaft bearings, a control arm connected to said control shaft extends upwardly at an angle toward said cutter means and is pivotally connected along its length to a control arm extension, said control arm extension is connected to said cutter means, whereby said automatic angle adjuster assembly maintains said cutter means at a desired preset cutting angle as said self-propelled riding power platform moves around a tree.

6. The trimming apparatus according to claim 5, wherein a counter weight shaft is connected to said control shaft, counter weights are positioned on said counter weight shaft to balance the weight of said cutter means.

7. The trimming apparatus according to claim 6, wherein said cutter means is a sickle bar type, said tree trimming cutter assembly includes a power transmission device and a transmission power cable to provide power to said cutter means.

8. The trimming apparatus according to claim 6, wherein a lateral support arm is movably connected between said cutter means and said angle adjusting support means to stabilize forward and back movement of said cutter means.

9. The trimming apparatus according to claim 5, wherein a pendulum stabilizer is connected between said angle adjusting support means and said pendulum arm to dampen the swinging of the pendulum when said trimming apparatus is in operation over rough ground.

10. The trimming apparatus according to claim 9, wherein said cutter means is a sickle bar type, said tree trimming cutter assembly includes a power transmission device and a transmission power cable to provide power to said cutter means.

* * * * *